(12) United States Patent
Kang et al.

(10) Patent No.: US 7,436,620 B1
(45) Date of Patent: Oct. 14, 2008

(54) METHOD FOR SELECTING AN ELECTRICAL POWER TO BE APPLIED TO A HEAD-BASED FLYING HEIGHT ACTUATOR

(75) Inventors: Soo-Choon Kang, San Jose, CA (US); Liwei Song, San Jose, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 0 days.

(21) Appl. No.: 11/754,896

(22) Filed: May 29, 2007

(51) Int. Cl.
*G11B 21/02* (2006.01)
(52) U.S. Cl. .......................................... 360/75; 360/31
(58) Field of Classification Search ................. 360/290, 360/294
See application file for complete search history.

(56) References Cited

U.S. PATENT DOCUMENTS

| | | | |
|---|---|---|---|
| 5,594,595 A | 1/1997 | Zhu | |
| 5,943,189 A | 8/1999 | Boutaghou et al. | |
| 5,991,113 A | 11/1999 | Meyer et al. | |
| 6,052,243 A | 4/2000 | Shimada | |
| 6,097,559 A | 8/2000 | Ottesen et al. | |
| 6,288,856 B1 | 9/2001 | Ottesen et al. | |
| 6,359,746 B1 | 3/2002 | Kakekado et al. | |
| 6,501,606 B2 | 12/2002 | Boutaghou et al. | |
| 6,529,342 B1 | 3/2003 | Feng et al. | |
| 6,577,466 B2 | 6/2003 | Meyer et al. | |
| 6,624,984 B2 | 9/2003 | Lewis et al. | |
| 6,700,724 B2 | 3/2004 | Riddering et al. | |
| 6,717,764 B2 | 4/2004 | Lake | |
| 6,775,089 B1 | 8/2004 | Bonin et al. | |
| 6,798,605 B2 | 9/2004 | Kurita et al. | |
| 6,801,376 B2 | 10/2004 | Smith | |
| 6,822,816 B2 | 11/2004 | Dakroub | |
| 6,876,509 B2 | 4/2005 | Bonin et al. | |
| 6,975,472 B2 | 12/2005 | Stover et al. | |
| 6,980,383 B2 | 12/2005 | Brunnett et al. | |
| 7,016,131 B2 | 3/2006 | Liu et al. | |
| 7,023,647 B2 | 4/2006 | Bloodworth et al. | |
| 7,038,875 B2 | 5/2006 | Lou et al. | |
| 7,068,457 B2 | 6/2006 | Riddering et al. | |
| 7,079,353 B2 | 7/2006 | Hsiao et al. | |
| 7,092,193 B1 | 8/2006 | McKenzie et al. | |
| 7,180,692 B1 | 2/2007 | Che et al. | |
| 2003/0002183 A1 | 1/2003 | Fioravanti | |
| 2003/0218813 A1 | 11/2003 | Dakroub | |
| 2004/0075940 A1 | 4/2004 | Bajorek et al. | |
| 2004/0130820 A1 | 7/2004 | Ota | |
| 2004/0184192 A1 | 9/2004 | Ota et al. | |
| 2005/0128630 A1 | 6/2005 | Huang et al. | |

(Continued)

*Primary Examiner*—Jason C Olson
(74) *Attorney, Agent, or Firm*—Barcelo & Harrison, LLP (57) ABSTRACT

A novel method of selecting an electrical power, to be applied to a subject head-based flying height actuator during operation of a disk drive, is disclosed and claimed. A touch-down power for each of a plurality of representative heads is detected. A relationship between back-off power and touch-down power for the plurality of representative heads is estimated. A touch-down power for the subject head is detected. A back-off power for the subject head is calculated using the estimated relationship and the detected touch-down power for the subject head. The electrical power to be applied to the subject head-based flying height actuator is selected to be equal to the detected touch-down power for the subject head minus the calculated back-off power for the subject head.

17 Claims, 6 Drawing Sheets

U.S. PATENT DOCUMENTS

2005/0243473 A1  11/2005  Hu et al.
2006/0028754 A1   2/2006  Suk
2007/0268615 A1 * 11/2007  McFadyen et al. ............ 360/75

* cited by examiner

METHOD FOR SELECTING AN ELECTRICAL POWER TO BE APPLIED TO A HEAD-BASED FLYING HEIGHT ACTUATOR

FIELD OF THE INVENTION

The present invention relates generally to the field of information storage devices, and more particularly to the active control of the flying height of read heads used in such devices.

BACKGROUND

Information storage devices are used to retrieve and/or store data in computers and other consumer electronics devices. A magnetic hard disk drive is an example of an information storage device that includes one or more heads that can both read and write, but other information storage devices also include heads—sometimes including heads that cannot write.

Figure 1:
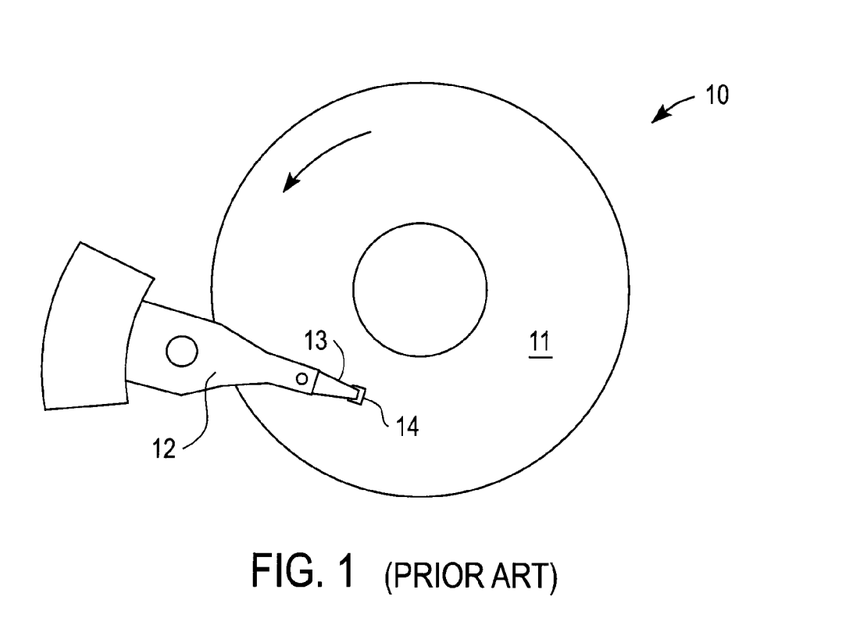
FIG. 1 is an illustration of a track seeking/track following actuator with an attached head gimbal assembly, positioned over a spinning disk in a contemporary disk drive.

The typical hard disk drive includes a head disk assembly (HDA) and a printed circuit board (PCB) attached to a disk drive base of the HDA. Referring now to FIG. 1, the head disk assembly 10 includes at least one disk 11 (such as a magnetic disk, magneto-optical disk, or optical disk), and a track seeking/track following actuator 12, and at least one head gimbal assembly (HGA) that includes a head 14 and a suspension assembly 13. During operation of the disk drive, the track seeking/track following actuator 12 must rotate to position the head 14 adjacent desired information tracks on the disk 11. An arrow on disk 11 indicates the direction of disk rotation in FIG. 1. Track seeking/track following actuator 12 is typically a rotary actuator driven by a voice coil motor. The disk 11 includes a conventional information storage media (e.g. hard magnetic layer protected by a thin overcoat layer and supported by a substrate and various underlayers).

In a magnetic hard disk drive, the head typically comprises a body called a "slider" that carries a magnetic transducer on its trailing end. The magnetic transducer typically comprises a writer and a read element. The magnetic transducer's writer may be of a longitudinal or perpendicular design, and the read element of the magnetic transducer may be inductive or magnetoresistive. In a magnetic hard disk drive, the transducer is typically supported in very close proximity to the magnetic disk by a hydrodynamic air bearing. As the motor rotates the magnetic disk, the hydrodynamic air bearing is formed between an air bearing surface of the slider of the head, and a surface of the magnetic disk. The thickness of the air bearing at the location of the transducer is commonly referred to as "flying height."

Magnetic hard disk drives are not the only type of information storage devices that have utilized air bearing sliders. For example, air bearing sliders have also been used in optical information storage devices to position a mirror and an objective lens for focusing laser light on the surface of disk media that is not necessarily magnetic.

The flying height is a key parameter that affects the performance of an information storage device. Accordingly, the nominal flying height is typically chosen as a careful compromise between each extreme in a classic engineering "trade-off." If the flying height is too high, the ability of the transducer to write and/or read information to/from the disk surface is degraded. Therefore, reductions in flying height can facilitate desirable increases in the areal density of data stored on a disk surface. However, the air bearing between the slider and the disk surface can not be eliminated entirely because the air bearing serves to reduce friction and wear (between the slider and the disk surface) to an acceptable level. Excessive reduction in the nominal flying height degrades the tribological performance of the disk drive to the point where the disk drive's lifetime and reliability become unacceptable.

One way that a disk drive designer can improve the prospects of reaching an acceptable compromise in the "trade-off" described above, is to increase the complexity of the disk drive so as to dynamically control flying height. That is, additional head components and/or disk drive components that can function as a flying height actuator are included and actively controlled so that the flying height can be temporarily reduced only while the head is reading or writing. When the head is not reading or writing, it can "fly" at a slightly-higher nominal flying height to improve tribological performance. Such active control of flying height is sometimes referred to as "dynamic flying height" control (a.k.a. "DFH").

Several types of flying height actuators have been published. One type of head-based flying height actuator incorporates a heating element into or near the magnetic transducer, to temporarily cause thermal expansion of a portion of the transducer and thereby bring it closer to the rotating disk. For example, U.S. Pat. No. 5,991,113 discloses such a resistive heating element, which can cause the pole tips of the transducer to protrude toward the disk relative to the air bearing surface of the slider such that the flying height at the location of the transducer is reduced. Additional examples of head-based flying height actuators employing a heater include U.S. Pat. No. 6,975,472, and U.S. Patent Application Publications US 2004/0184192 and US 2004/0130820.

If a transducer heater is used for flying height actuation via thermal expansion of the head near the transducer, such thermal expansion may also temporarily and locally change the contour of the air bearing surface in such a way that flying height is otherwise increased. That is, such temporary and local changes in the air bearing surface contour may undesirably oppose the intended effect of the transducer heater by increasing flying height when a further decrease is desired. This undesirable phenomenon may be referred to as thermal expansion "push back."

Magnetostrictive material disposed in or adjacent to the magnetic transducer can also be configured to function as a head-based flying height actuator, by causing expansion or translation of all or a portion of the magnetic transducer towards/away from the disk surface. An example of a magnetostrictive flying height actuator is described in U.S. Patent Application Publication 2005/0243473.

Another head-based flying height actuation approach involves controlling the flying height via electrostatic forces, by applying a voltage between the slider and the disk. For example, head-based electrostatic flying height actuation is described in U.S. Pat. No. 6,359,746, U.S. Pat. No. 6,529,342, and U.S. Pat. No. 6,775,089.

Piezoelectric head-based flying height actuators have also been published, for example in U.S. Pat. No. 5,943,189, U.S. Pat. No. 6,501,606 and U.S. Pat. No. 6,577,466. Although in most cases the piezoelectric head-based flying height actuator functions by moving the magnetic transducer relative to the slider, the piezoelectric head-based flying height actuator may be used to change the flying height by altering a crown curvature of the slider (e.g. U.S. Pat. No. 6,624,984).

All of these head-based flying height actuators serve to change the flying height in response to an electrical input. Typically, the greater the electrical power applied to the head-based flying height actuator, the more the flying height will be reduced at the location of the transducer, until a portion of the head touches the disk surface—a condition known as "touch down". Touch-down serves to limit further reductions in flying height, even if/when the electrical power applied to the flying height actuator is further increased. Actual or imminent touch down may even cause an increase in a time-average of flying height due to an increase in push back and/or an increase in flying height oscillations caused by contact forces.

A desired flying height of the head may be obtained by selecting an appropriate electrical power to be applied to the head-based flying height actuator, the appropriate power being some amount less than the so-called "touch down power" (i.e. the power required to cause touch down). However, the touch down power is, in general, unique to each head. Moreover, techniques to determine the touch down power for a given head have been unsuitable for a high-volume manufacturing environment, inconvenient, and/or have required specialized or expensive equipment. Accordingly, selecting an appropriate electrical power to be applied to each head assembled into thousands of disk drives manufactured each week presents a difficult but important challenge to disk drive industry engineers. Thus, there is a need in the art for a practical method to select an electrical power to be applied to a head-based flying height actuator during operation of a disk drive.

SUMMARY

A novel method of selecting an electrical power, to be applied to a subject head-based flying height actuator during operation of a disk drive, is disclosed and claimed. The disk drive has a subject disk and a subject head that includes a transducer and the subject head-based flying height actuator.

A touch-down power for each of a plurality of representative heads is detected. Each of the plurality of representative heads includes a representative flying height actuator. Each of the plurality of representative heads is in intermittent contact with a representative disk when the touch-down power corresponding to that representative head is applied to the representative flying height actuator of that representative head.

A relationship between back-off power and touchdown power for the plurality of representative heads is estimated. Each of the plurality of representative heads has a specified transducer-disk spacing when the touch-down power detected for that representative head minus a back-off power calculated for that representative head is applied to the representative flying height actuator of that representative head.

A touch-down power for the subject head is detected. A back-off power for the subject head is calculated using the estimated relationship and the detected touch-down power for the subject head. The electrical power to be applied to the subject head-based flying height actuator is selected to be equal to the detected touch-down power for the subject head minus the calculated back-off power for the subject head.

BRIEF DESCRIPTION OF DRAWINGS

FIG. 2 is an illustration depicting a side-view of a head in operation over a spinning disk, the head being capable of use with an embodiment of the present invention. FIG. 2 is not to scale; rather, certain dimensions have been exaggerated so that the microscopic head disk spacing and slight pitch angle can be discerned.

FIG. 3 is cross-sectional view of a magnetic transducer of a head shown to include three alternative exemplary embodiments of a head-based flying height actuator capable of use with the present invention. FIG. 3 is not to scale; rather, certain dimensions have been exaggerated so that each of the sub-components of the magnetic transducer can be labeled.

DETAILED DESCRIPTION OF EXEMPLARY EMBODIMENTS

Figure 2:
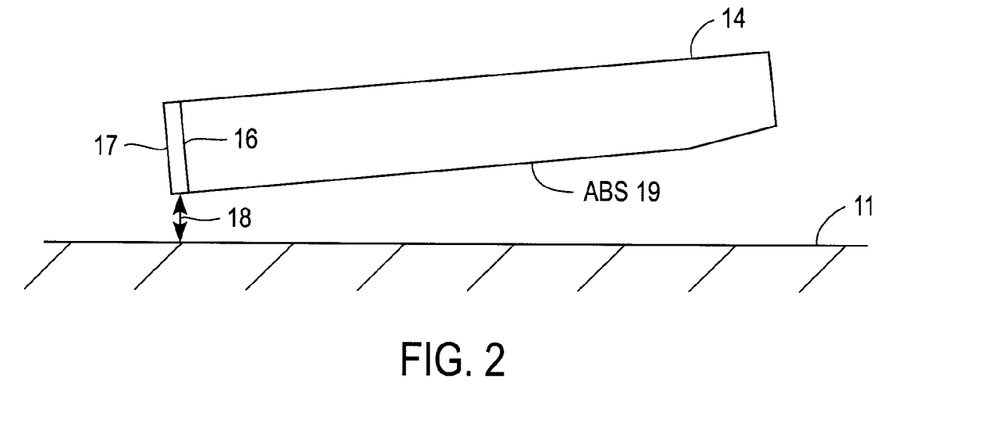

FIG. 2 is an illustration depicting a side-view of a head 14 in operation over a spinning disk 11, the head 14 being capable of use with an embodiment of the present invention. FIG. 2 is not to scale; rather, certain dimensions have been exaggerated so that the microscopic transducer-disk spacing 18 and slight pitch angle of air bearing surface (ABS) 19 can be discerned. The slider of head 14 includes a trailing face 16 on which a magnetic transducer 17 is fabricated by conventional photolithographic and vacuum deposition and etching techniques. The transducer 17 of head 14 can be positioned towards or away from the disk 11 relative to ABS 19 by a head-based flying height actuator, which may be included within transducer 17, so that the transducer-disk spacing 18 can be adjusted.

Figure 3:
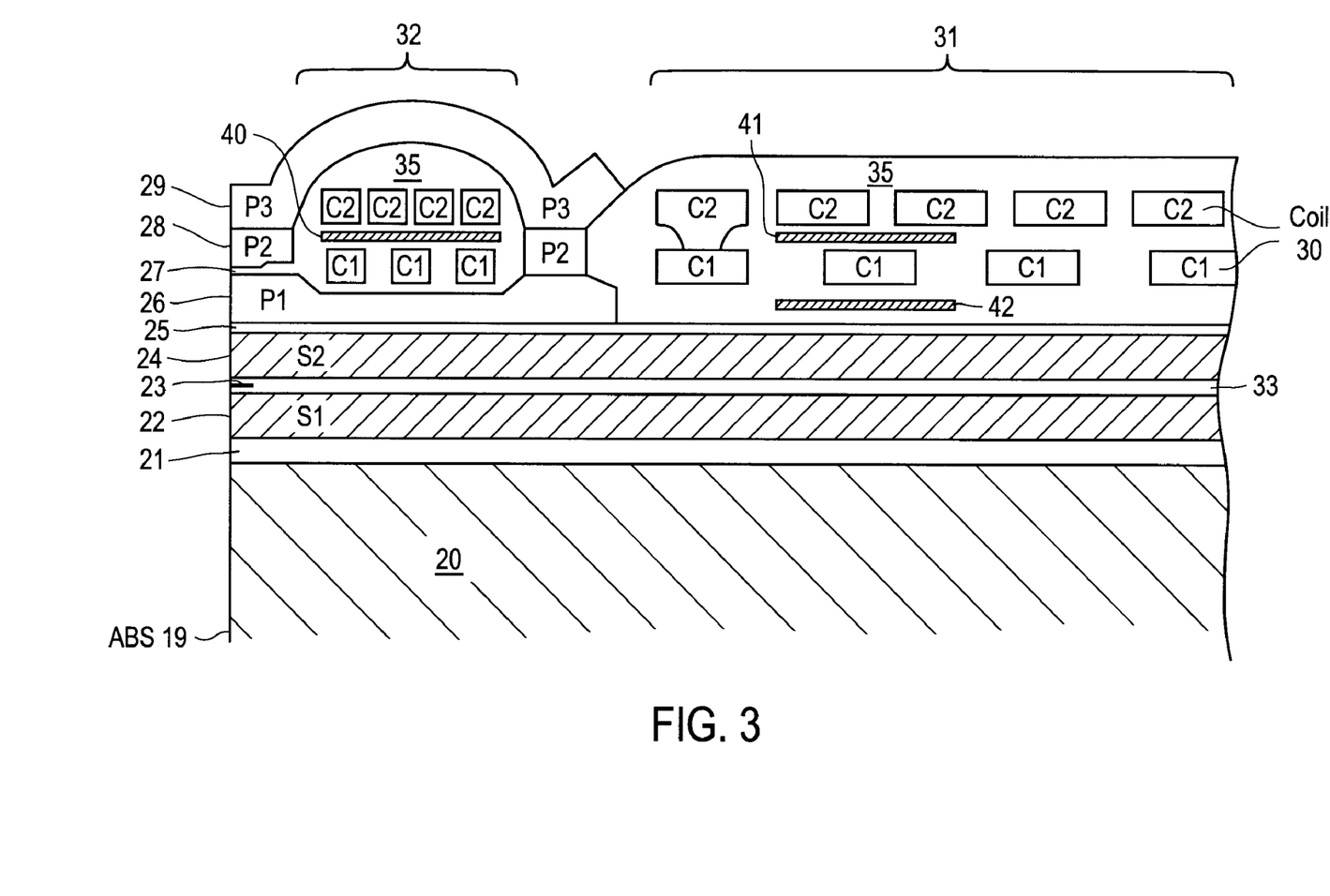

FIG. 3 is cross-sectional view of a magnetic transducer shown to include three alternative exemplary embodiments of a head-based flying height actuator capable of use with the present invention. FIG. 3 is not to scale; rather, certain dimensions have been exaggerated so that each of the sub-components of the magnetic transducer can be labeled. The magnetic transducer of FIG. 3 comprises a layered structure formed on the trailing-side surface of a slider 20. Slider 20 may comprise AlTiC (Al2O3-TiC). The magnetic transducer is constructed by depositing and etching various layers on the slider 20.

The reader layers of the magnetic transducer of FIG. 3 include an undercoat 21 consisting of a nonmagnetic material such as alumina (Al2O3); a lower (S1) magnetic shield layer 22 consisting of a soft magnetic material (e.g., NiFe, FeN, CoFe, etc.); a conventional magneto-resistive (MR) element 23 embedded in a nonmagnetic material layer 33; and an upper (S2) magnetic shield layer 24 consisting of a soft magnetic material. The nonmagnetic material layer 33 disposed between layers 22 & 24 and around MR element 23 may comprise aluminum nitride (AlN), aluminum nitrate (AlNO3), or alumina. Information magnetically recorded in the media can be reproduced by detecting changes in the electrical resistance of MR element 23, which occur in response to remnant magnetic fields from a nearby disk media.

The writer layers of the magnetic transducer of FIG. 3 include a first magnetic pole layer 26 consisting of a soft magnetic material; a gap layer 27 comprising a nonmagnetic material 35 (e.g., alumina) that also surrounds the first and second turn layers (C1 & C2) of a coil 30, and is also used in separation layer 25; a second magnetic pole layer 28; and a third magnetic pole layer 29. The second and third magnetic pole layers 28 & 29 typically comprise a soft magnetic material and are connected together. One section of pole layer 26 is also connected to a section of pole layer 28. Alternatively, first pole layer 26 and upper shield layer 24 may be formed as a single integral layer, rather than as the two layers separated by nonmagnetic layer 25.

Collectively, the first, second, and third pole layers comprise the yoke portion 32 of the magnetic transducer. In the magnetic transducer shown in FIG. 3, coil 30 has a first layer of turns C1 and a second layer of turns C2 which pass through the yoke portion 32 of the magnetic transducer (i.e. the portion nearest the trailing edge of ABS 19 between pole layers 26 & 29). The turns of coil 30 also pass outside of the yoke portion in a region 31 that is farther from the trailing edge of ABS 19. A magnetic field can be generated across gap layer 27 by application of current to coil 30 to record information on a nearby magnetic disk media (not shown in FIG. 3).

An overcoat layer (not shown), consisting of a nonmagnetic material, typically covers the entire thin-film transducer. Also, a diamond-like carbon (DLC) material may also be applied to the magnetic transducer to protectively cover the pole tips and/or to enhance tribological performance by covering portions of ABS 19.

A resistive heating element 40 may be integrated into the thin-film transducer to cause protrusion of the pole tips of layers 26, 28 and 29. Resistive heating element 40 serves as a head-based flying height actuator because temporary application of power to the resistive heating element 40 causes a temporary expansion of at least the tips of poles 26, 28, and 29, such that the head-disk spacing at the location of the magnetic transducer is temporarily reduced. Alternatively, a resistive heating element in the position labeled 41, or in the position labeled 42, may serve as the head-based flying height actuator, the position being chosen to cause thermal pole tip protrusion, preferably with limited temperature rise in the magnetoresistive (MR) reading element 23.

Figure 4:
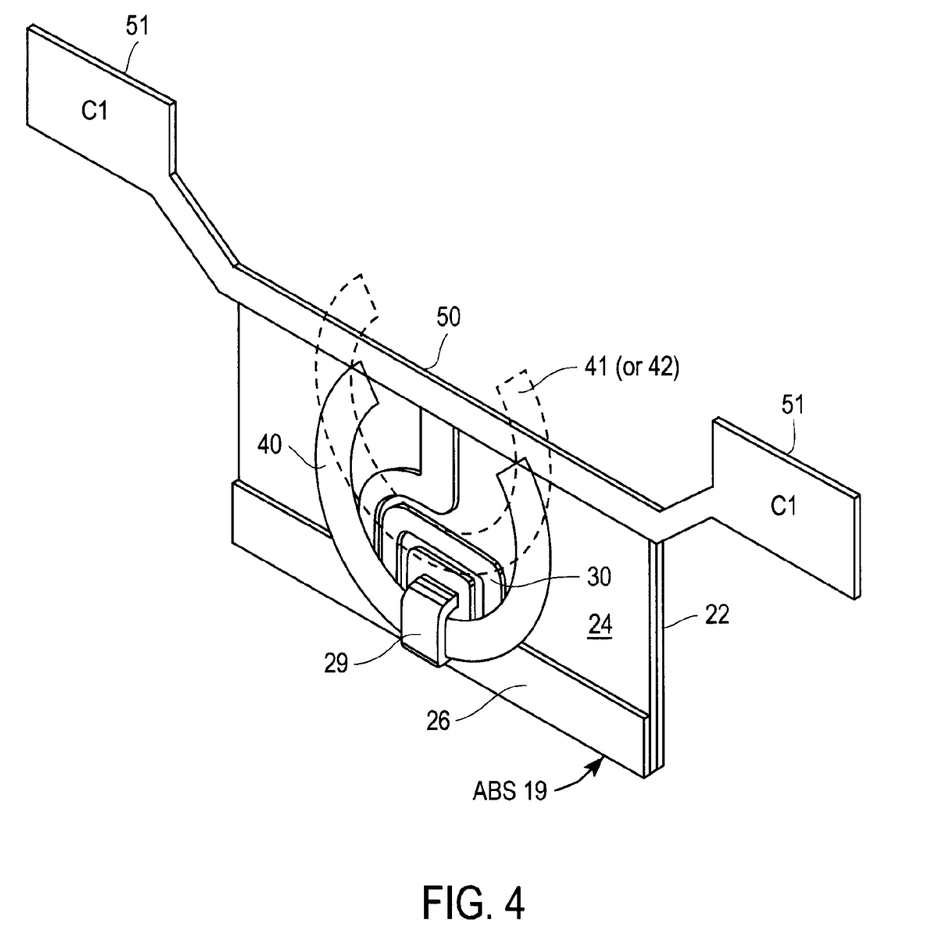
FIG. 4 is a perspective view of a magnetic transducer of a head shown to include three alternative exemplary embodiments of a head-based flying height actuator capable of use with the present invention (not necessarily to scale).

FIG. 4 is a perspective view of a read/write transducer of a head shown to include three alternative exemplary embodiments of a head-based flying height actuator capable of use with the present invention (not necessarily to scale). Number labels in FIG. 4 accord with those used for the same or similar components shown in FIG. 3. As shown in FIG. 4, resistive heating element 40 may have a generally annular shape, e.g., like a horseshoe, having a middle portion passing through the yoke, and having first and second arms that extend away from ABS 19. Coil connection 50 extends in a direction approximately parallel to ABS 19 and electrically connects coil 30 with a pair of terminal bond pads 51 of the C1 layer. Coil connection 50 is disposed in the same general plane as the C1 coil layer. Alternatively, resistive heating element 41 (or 42) may be located farther away from ABS 19. For example, the portion of heating element 41 nearest the air-bearing surface may be disposed 20 μm to 60 μm from ABS 19.

Figure 5:
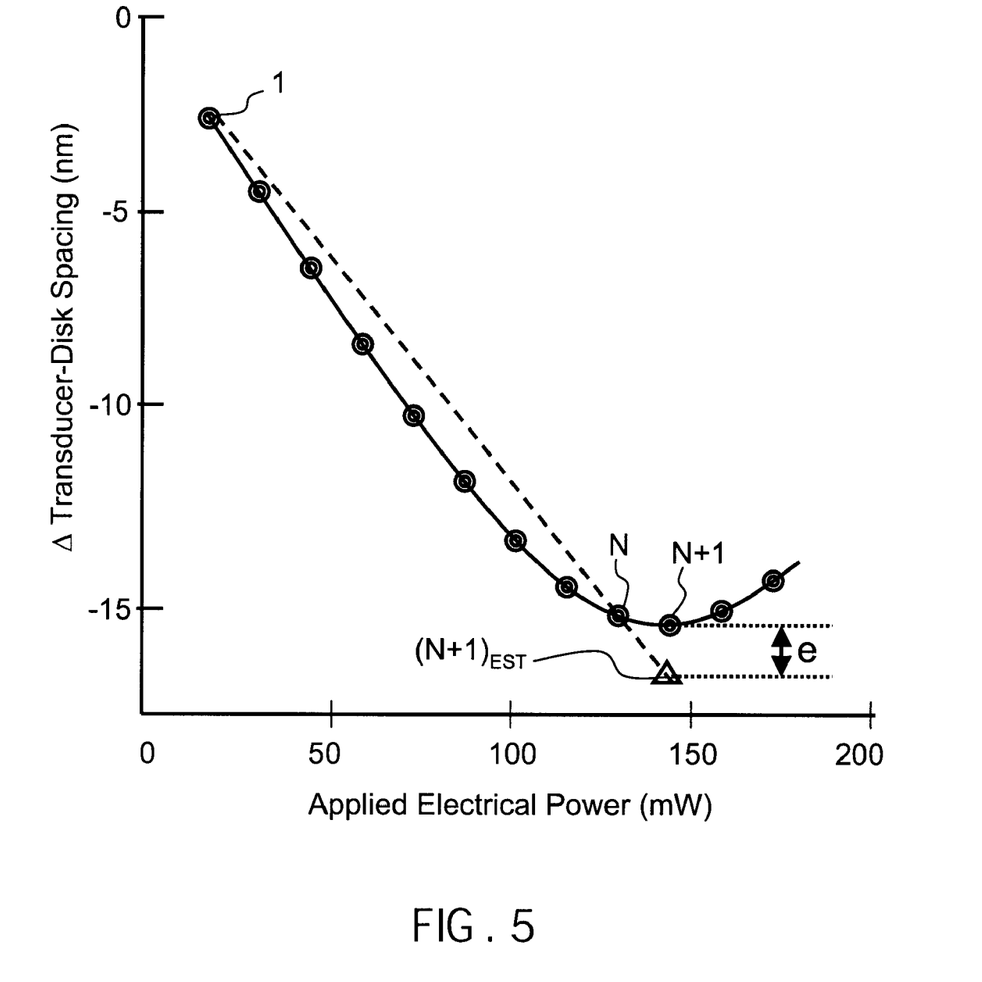
FIG. 5 is a graph of changes in transducer-disk spacing resulting from application of various electrical powers to a head-based flying height actuator.

FIG. 5 is a graph of changes in transducer-disk spacing resulting from application of various electrical powers to a head-based flying height actuator. The change in transducer-disk spacing can be determined by a conventional method of measuring a read-back signal from the head, and then determining a ratio between a first harmonic component and a third harmonic component of the read-back signal. The change in transducer-disk spacing is shown in FIG. 5 in units of nanometers, and the electrical power applied to the head-based flying height actuator is measured in units of milliwatts (mW).

In the embodiment of FIG. 5, as the power applied to the head-based flying height actuator is increased, the reduction in transducer-disk spacing becomes greater until approximately 140 mW of applied electrical power is reached. Applied electrical powers in that range bring about phenomena associated with touch down (e.g. an increase in push back and/or an increase in flying height oscillations caused by contact forces), which diminish the rate that transducer-disk spacing is reduced by further increases in applied electrical power, and which can ultimately cause transducer-disk spacing to increase with still further increases in applied electrical power.

The touch-down power for the embodiment shown in FIG. 5 can be determined in the following way. A linear relationship between the change in transducer-disk spacing (S) and electrical power (P) can be derived to fit the point labeled 1 in FIG. 5 and the point labeled N in FIG. 5. Preferably, it is first confirmed that spacing decreases with increasing power at the point labeled 1 (or else a subsequent point, for which local spacing decrease can be confirmed, is chosen as the point labeled 1). Specifically, if point 1 corresponds to a first power of $P_1=14$ mW, and a first spacing of $S_1=-2.5$ nm, and point N corresponds to a second power of $P_N=130$ mW, and a second spacing of $S_N=-15.1$ nm, then the slope (rise/run) of the linear relationship would be $-12.6$ nm/116 mW=$-0.11$ nm/mW, and the y-intercept of the linear relationship would be approximately $-1$ nm. Thus, the linear relationship could be expressed as:

$$S=(-0.11\ nm/mW)\cdot P-1\ nm$$

The next measured point on the graph of FIG. 5 is labeled N+1, and corresponds to a third electrical power $P_{N+1}=144$ mW and a third spacing $S_{N+1}=-15.2$ nm. However, the derived linear relationship can be used to estimate the third spacing as:

$$S_{(N+1)EST}=(-0.11\ nm/mW)\cdot(144\ mW)-1\ mm=-16.8\ nm$$

The error labeled as "e" between the third spacing and the estimated third spacing in FIG. 5 is: $e=|S_{(N+1)}-S_{(N+1)EST}|=|-15.2\ nm-(-16.8\ nm)|=1.6\ nm$.

In the embodiment of FIG. 5, the touch-down power $P_{TD}$ is defined to be substantially equal to the second electrical power if the error "e" between the third spacing and the estimated third spacing is larger than a first threshold of 0.7 nm. Since 1.6 nm>0.7 nm, $P_{TD}$ is defined to be equal to $P_N=130$ mW for the embodiment of FIG. 5.

Of course, the first threshold chosen for a given embodiment will depend upon several factors including the magnitude of the steps in power between measurement points for that embodiment. Preferably, the steps in power are chosen to be in a range between 5 mW and 20 mW, and the first threshold is preferably less than 1 nm. For example, in the embodiment of FIG. 5, the steps in power between measurement points were chosen to be approximately 14 mW and the first threshold was chosen to be 0.7 nm. The first threshold for a given embodiment may also depend on whether the subject disk drive is a single platter disk drive or a multi-platter disk drive. The first threshold for a multi-platter disk drive is preferably in the range 0.5 nm to 0.7 nm.

In the foregoing description of FIG. 5, it was assumed that $S_N$ and $S_{N+1}$ were determined by measurement, perhaps based on a ratio between a first harmonic component and a third harmonic component of a measured read-back signal from the head. However, it is also possible to determine $S_N$ and/or $S_{N+1}$ based on a non-linear curve fit to a plurality of preceding measured data points. For example, the non-linear relationship may be a quadratic or cubic polynomial adjusted to the data using a conventional curve fitting technique.

In some cases, even if the error between the third spacing and the estimated third spacing does not exceed the first threshold (i.e. first condition is not met), the touch-down power $P_{TD}$ may be defined to be substantially equal to the second electrical power if a difference between the third spacing and the second spacing is smaller than a second threshold (i.e. second condition is met). FIG. 5 illustrates why such an inequality (i.e. the second condition) may indicate touch-down, because a flattening of the local slope of the curve, attributable to touch-down, can be observed near points N and N+1. For example, if the second threshold for the embodiment of FIG. 5 is chosen to be 0.5 nm, then satisfaction of the second condition also leads to $P_{TD}$ being defined to be $P_N$=130 mW because the local slope of the curve near point N is close enough to horizontal that:

$$|S_{(N+1)} - S_N| < 0.5 \text{ nm}.$$

If neither the first condition nor the second condition are initially satisfied, then the point N is indexed and the process is repeated. In other words, point N+1 is treated as point N was before, and a new linear relationship is derived to fit the point labeled as 1 and the point that was previously labeled as N+1, and so on, until satisfaction of either the first condition or the second condition leads to the definition of the touch-down power $P_{TD}$.

Figure 6:
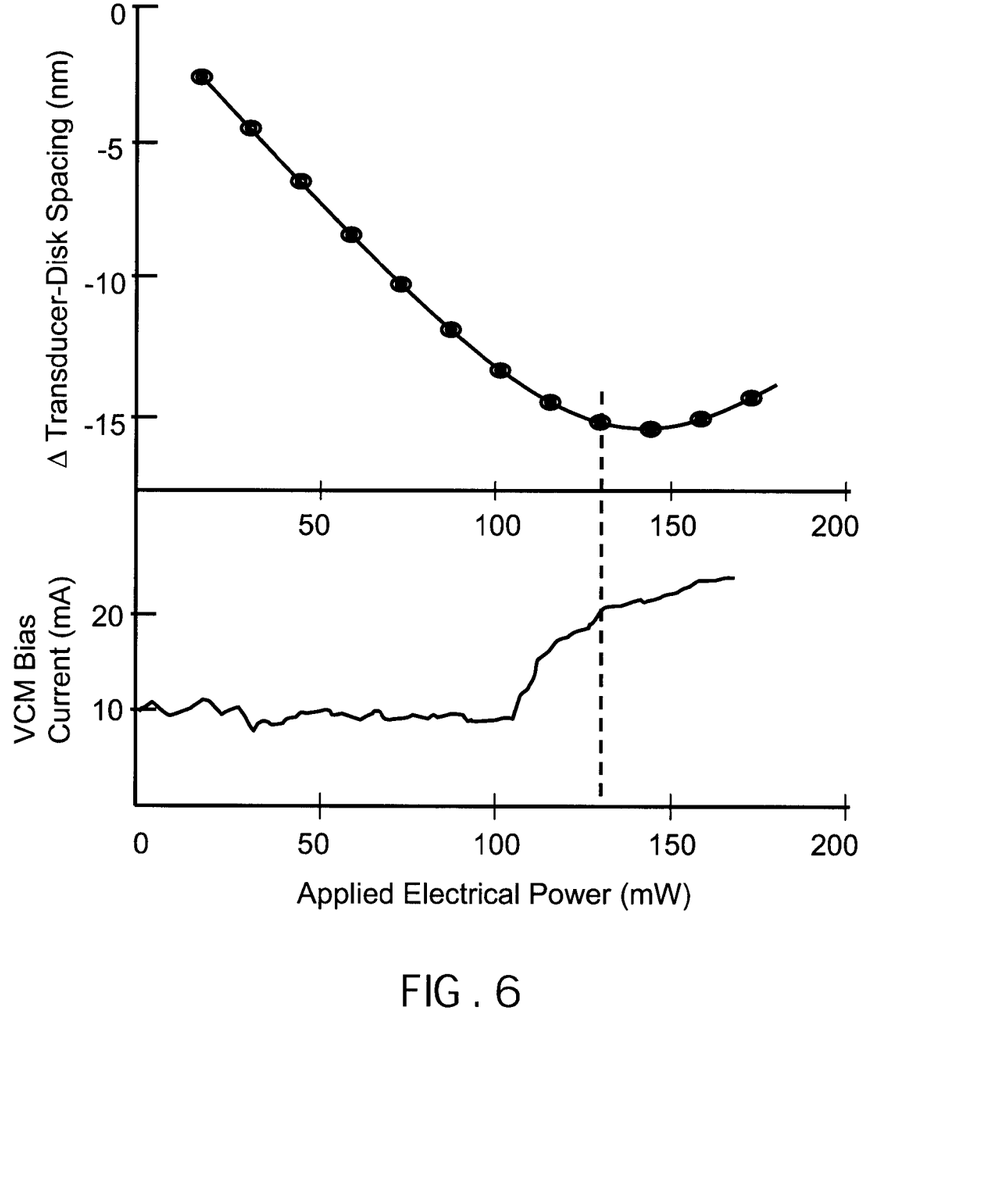
FIG. 6 is a graph of changes in transducer-disk spacing resulting from application of various electrical powers to a head-based flying height actuator, plotted together with voice coil motor bias current.

In a preferred embodiment, the electrical current that drives the voice coil motor (that radially positions the subject head relative to an axis of rotation of the subject disk in the disk drive) is monitored, and the touch-down power for the subject head detected as the electrical power applied to the subject flying height actuator at which the voice coil motor bias current increases and/or becomes erratic. Such an increase or erratic nature in the voice coil motor bias current may manifest itself as a marked increase in the amplitude of voice coil motor bias current fluctuations during track following, for example. FIG. 6 is a graph of changes in transducer-disk spacing resulting from application of various electrical powers to a head-based flying height actuator, plotted together with VCM bias current.

The touch-down power for the embodiment shown in FIG. 6 can be determined in the following way. First, the power applied to the head-based flying height actuator is set to zero, and the VCM bias current is monitored and preferably digitally sampled, for example for 100 disk revolutions. A VCM bias current baseline may then be chosen, for example the mean VCM bias current, the median VCM bias current, or the 75th percentile value of the VCM bias current. Next, the power applied to the head-based flying height actuator can be increased, while the VCM bias current is monitored. If/when the VCM bias current exceeds the baseline by some specified margin (e.g. 1.7 times the baseline), then the touch down power is defined to equal the power then applied to the flying height actuator.

Preferably, the VCM bias current and read-back signal are monitored together to record the transducer-disk spacing and VCM bias current simultaneously as shown in FIG. 6. Such data can later be used to facilitate determination of a desired power to be applied to the flying height actuator during operation of the head (i.e. touch-down power minus the so-called "back-off power" described later).

Figure 7:
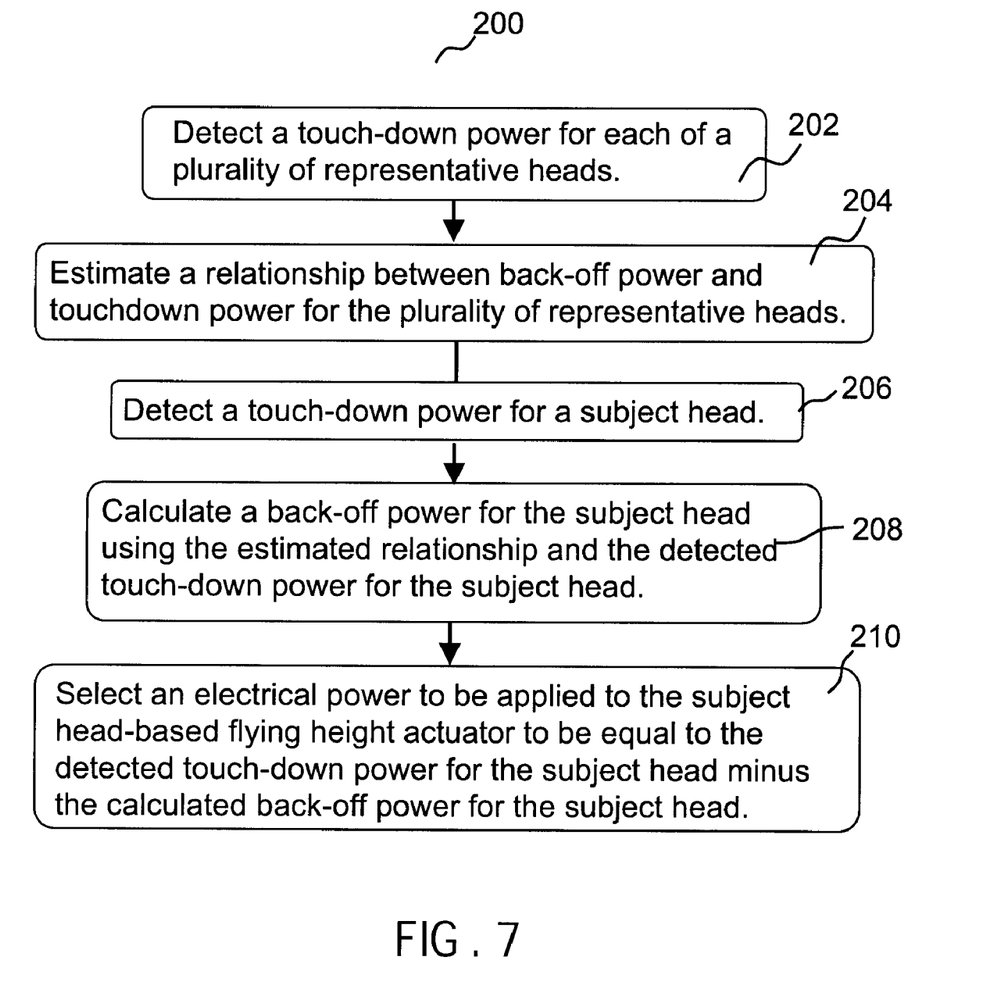
FIG. 7 is a flow chart depicting a method in accordance with an embodiment of the present invention.

FIG. 7 is a flow chart depicting a method 200 in accordance with an embodiment of the present invention. The method 200 is used to select an electrical power, to be applied to a subject head-based flying height actuator during operation of a disk drive.

In step 202, a touch-down power is detected for each of a plurality of representative heads, each of the plurality of representative heads including a representative flying height actuator. Preferably, the touch-down power may be detected according to the procedure given in the preceding description of FIG. 6. The touch-down power may also be detected according to the exemplary procedure for touch-down power definition given in the preceding description of FIG. 5. Also for example, touch-down may be detected by distortion of the read-back signal from the head (e.g. amplitude modulation, frequency modulation). The read back signal may be measured using a dynamic electrical test stand to which the representative head is mounted, the representative head not being mounted within any disk drive. Alternatively, the read back signal may be obtained by circuitry pertaining to a representative disk drive with the representative head being mounted within the representative disk drive. No matter how detected, touch-down is defined to occur when the transducer-disk spacing is reduced to the point where the head is in intermittent contact with a corresponding disk. The power applied to the head-based flying height actuator when touch-down occurs is thus defined to be the touch-down power $P_{TD}$.

It is generally not desirable to attempt to read or write data with a head while it is in a touch-down condition, because, for example, off-track motions and amplitude and frequency modulation of the read back signal, associated with frequent intermittent contact between the head and the disk, tend to degrade signal to noise ratio and increase error rate. Therefore, it is generally not desirable to attempt to read or write data with a head while its touch-down power is applied to its head-based flying height actuator. Rather, a power less than the touch-down power $P_{TD}$, by some amount herein referred to as the "back-off power" $P_{BO}$, is preferably applied to the head-based flying height actuator when the head is reading or writing.

If the same back-off power were always subtracted from the touch-down power for each head, then manufacturing variations within a population of heads will result in substantial variation in the transducer-disk spacing when reading and writing within that population of heads. More preferably, a unique and (in general) different back-off power should be applied to each head within a population of heads, so that the ultimate variation in transducer-disk spacing when reading and writing is reduced. Accordingly, the back-off power $P_{BO}$, as used herein, is defined such that the transducer of each head within a population of heads is spaced from the disk by a specified transducer-disk spacing when the touch-down power $P_{TD}$ detected for that head minus a back-off power $P_{BO}$ determined for that head is applied to the flying height actuator of that head. Under this definition, just as the touch-down power $P_{TD}$ is, in general, unique and different for each head, so is the back-off power $P_{BO}$. The specified transducer-disk spacing may be chosen by the disk drive designer to be small enough to achieve acceptable drive performance in terms of amplitude modulation, bit error rate, and signal-to-noise ratio, while being large enough to not unacceptably adversely affect tribological lifetime and reliability. For example, in certain embodiments the specified transducer-disk spacing may be chosen to be in the range 0.5 nm to 4 nm.

In step 204 of the embodiment of FIG. 7, a relationship between back-off power and touchdown power is estimated for the plurality of representative heads. In certain embodiments, this relationship can be treated as approximately linear, characterized by a slope and a y-intercept, the slope and the y-intercept being chosen to minimize a sum of squared discrepancies between the back-off powers determined for the plurality of representative heads, and corresponding back-off powers predicted by the linear relationship for the plurality of representative heads. The relationship between back-off power and touchdown power is specific to the head design that is shared by the heads in a given population. For example, parameters of the head design that determine the relationship between back-off power and touchdown power include air bearing design, transducer design, materials and sensitivity, and fly height actuator stroke and gain. Preferably but not necessarily, step 204 is performed prior to fabrication of the disk drive that contains the subject head-based flying height actuator.

In step 206, a touch-down power is detected for the subject head that includes the subject head-based flying height actuator. Preferably, the touch-down power is detected according to the same procedure used for step 202.

In step 208, a back-off power for the subject head is calculated using the relationship estimated in step 204 and the touch-down power for the subject head that was detected in step 206.

In step 210, and electrical power to be applied to the subject head-based flying height actuator is selected to be equal to the detected touch-down power for the subject head minus the calculated back-off power for the subject head.

In the foregoing specification, the invention is described with reference to specific exemplary embodiments thereof, but those skilled in the art will recognize that the invention is not limited thereto. It is contemplated that various features and aspects of the above-described invention may be used individually or jointly and possibly in an environment or application beyond those described herein. The specification and drawings are, accordingly, to be regarded as illustrative and exemplary rather than restrictive. The terms "comprising," "including," and "having," as used herein are intended to be read as open-ended terms.

What is claimed is:

1. A method of selecting an electrical power to be applied to a subject head-based flying height actuator during operation of a disk drive having a subject disk and a subject head that includes a transducer and the subject head-based flying height actuator, the method comprising:

detecting a touch-down power for each of a plurality of representative heads, each of the plurality of representative heads including a representative flying height actuator, wherein each of the plurality of representative heads is in intermittent contact with a representative disk when the touch-down power corresponding to that representative head is applied to the representative flying height actuator of that representative head;

estimating a relationship between back-off power and touch-down power for the plurality of representative heads, wherein each of the plurality of representative heads has a specified transducer-disk spacing when the touch-down power detected for that representative head minus a back-off power determined for that representative head is applied to the representative flying height actuator of that representative head;

detecting a touch-down power for the subject head;

calculating a back-off power for the subject head using the estimated relationship and the detected touch-down power for the subject head; and selecting the electrical power to be applied to the subject head-based flying height actuator to be equal to the detected touch-down power for the subject head minus the calculated back-off power for the subject head.

2. The method of claim 1, wherein the disk drive further comprises a voice coil motor (VCM) that radially positions the subject head relative to an axis of rotation of the subject disk in response to a VCM current, and wherein detecting the touch-down power for the subject head comprises determining an electrical power applied to the subject flying height actuator at which the VCM current exceeds a threshold.

3. The method of claim 1, wherein the specified transducer-disk spacing is in the range 0.5 nm to 4 nm.

4. The method of claim 1, wherein the subject head-based flying height actuator is a heating element that causes thermal expansion of the transducer.

5. The method of claim 1, wherein the subject head-based flying height actuator is a magnetostrictive material that is subject to a magnetic field created by the electrical power.

6. The method of claim 1, wherein the subject head-based flying height actuator is a piezoelectric material that moves the transducer.

7. The method of claim 1, wherein the subject head-based flying height actuator is a piezoelectric material that changes a crown curvature of the head.

8. The method of claim 1, wherein estimating the relationship is performed prior to fabrication of the disk drive.

9. The method of claim 1, wherein the relationship is linear and is characterized by a slope and a y-intercept, the slope and the y-intercept being chosen to minimize a sum of squared discrepancies between the back-off powers determined for the plurality of representative heads, and corresponding back-off powers predicted by the linear relationship for the plurality of representative heads.

10. The method of claim 1, further comprising measuring a measured transducer-disk spacing for each of the plurality of representative heads, the measurement based on a read-back signal obtained from that representative head.

11. The method of claim 10 wherein the back-off power for each the plurality of representative heads is determined as equaling the touch-down power detected for that representative head minus an electrical power applied to the representative flying height actuator of that representative head when the measured transducer-disk spacing equals the specified transducer-disk spacing.

12. The method of claim 10 wherein the read-back signal is obtained by a dynamic electrical test stand to which the representative head is mounted, the representative head not being mounted within any disk drive.

13. The method of claim 10 wherein the representative head is mounted within a representative disk drive, and the read-back signal is obtained by circuitry pertaining to the representative disk drive.

14. The method of claim 13, wherein detecting the touch-down power for each of the plurality of representative heads comprises determining an electrical power applied to the representative flying height actuator of that representative head at which an electrical current driving a voice coil motor in the representative disk drive exceeds a threshold.

15. The method of claim 1, wherein detecting the touch-down power for the subject head comprises determining an electrical power applied to the subject flying height actuator at which a read-back signal from the subject head is degraded by contact with the subject disk.

16. The method of claim 1, wherein detecting the touch-down power for each of the plurality of representative heads comprises determining an electrical power applied to the representative flying height actuator of that representative head at which a read-back signal from that representative head is degraded by contact with the subject disk.

17. The method of claim 1, wherein the selected electrical power is applied to the subject head-based flying-height actuator while the subject head is performing read or write operations, but not during a period when the subject head is not performing read or write operations.

* * * * *